United States Patent Office 3,519,635
Patented July 7, 1970

3,519,635
PHOTOCHROMIC COMPOSITIONS OF A THERMOPLASTIC POLYMER AND A POLYMERIC MATERIAL
Lewis Smith Meriwether, Stamford, Conn., and Edith Clara Breitner, Roslyn, N.Y., assignors to American Cyanamid Company, Stamford, Conn., a corporation of Maine
No Drawing. Continuation of application Ser. No. 323,580, Nov. 14, 1963. This application Apr. 18, 1968, Ser. No. 722,151
Int. Cl. G02b 1/04
U.S. Cl. 252—300                    10 Claims

ABSTRACT OF THE DISCLOSURE

Compositions of matter comprising a polymeric material having incorporated therein a compound having the formula

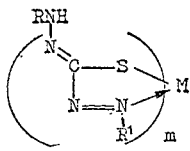

wherein M is $Pd^{II}$, $Pt^{II}$, $Ni^{II}$, $Ag^{I}$, $Zn^{II}$, $Cd^{II}$, $Pb^{II}$, $Bi^{III}$, or $Tl^{I}$, $m$ is a whole positive integer of 1–3, inclusive, and R and R' are, individually

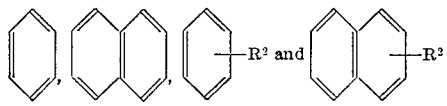

and $R^2$ is an alkyl ($C_1$–$C_4$), a nitro, a halo, an alkoxy ($C_1$–$C_4$), an aryloxy ($C_6$–$C_{10}$), a hydroxy, a carboxy, a carboxyalkyl ($C_2$–$C_4$), an alkoxycarbonyl ($C_2$–$C_6$), an aryl ($C_6$–$C_{10}$), a sulfamoyl, a sulfo, an arylamino ($C_6$–$C_{10}$), an alkylamino ($C_1$–$C_4$), an amino, an acyl ($C_2$–$C_{11}$), an acylamino ($C_1$–$C_{11}$), a tetralyl, a perfluoroalkylthio ($C_1$–$C_4$) or an alkylthio ($C_1$–$C_4$) radical, are disclosed.

CROSS-REFERENCES TO RELATED APPLICATIONS

This application is a continuation of our copending application Ser. No. 323,580, filed Nov. 14, 1963, now abandoned.

This invention relates to a novel group of photochromic compositions. More particularly, this invention relates to a novel group of photochromic compositions characterized by their ability to change their color upon being subjected to visible light. Still more particularly, this invention relates to a novel group of photochromic compositions comprising a thermoplastic polymer having dispersed throughout the body thereof, a compound having the formula (I)

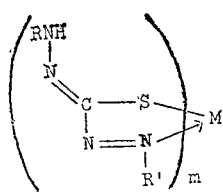

wherein M is $Pd^{II}$, $Pt^{II}$, $Ni^{II}$, $Ag^{I}$, $Zn^{II}$, $Cd^{II}$, $Pb^{II}$, $Bi^{III}$, or $Tl^{I}$, $m$ is a whole positive integer of from 1 to 3, inclusive, R and $R^1$ are individually

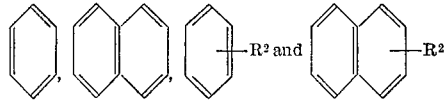

and $R^2$ represents alkyl ($C_1$–$C_4$), alkoxycarbonyl ($C_2$–$C_6$), aryl ($C_6$–$C_{10}$), nitro, sulfamoyl, sulfo, halo, arylamino ($C_6$–$C_{10}$), alkoxy ($C_1$–$C_4$), alkylamino ($C_1$–$C_4$), aryloxy ($C_6$–$C_{10}$), amino, acyl ($C_2$–$C_{11}$), hydroxy, acylamino ($C_1$–$C_{11}$), carboxy, carboxyalkyl ($C_2$–$C_4$), tetralyl, perfluoroalkylthio ($C_1$–$C_4$), or alkylithio ($C_1$–$C_4$) radicals.

Photochromic compounds are well known in the art as is the usage thereof in such applications as temporary storage devices, reflectants for high intensity radiation, and the like. These photochromic compounds generally become colored or change color upon subjection to visible or ultraviolet light and revert to their original color when they are removed from the ultraviolet or visible light and/or stored in the dark. Moreover, many of these known compounds change their color when they are exposed to ordinary sunlight and subsequently revert back to their original color upon removal thereof from the rays of the sun. Various other materials, however, change color only when subjected to a certain degree of irradiation and, as such, sunlight will not affect them. High intensity radiation, such as 10–25 cal./cm.²/sec. or more is necessary in regard to these compounds, while sunlight (0.2 cal./cm.²/sec.) will affect the former.

One problem, for which a solution is continually being sought, in regard to photochromic compositions, is the slow return rate of the photochromic materials now commercially available. In order for a photochromic composition to be highly effective for use in such applications as sunglasses, window panes, windshields, etc., the most critical feature resides in the return rate of the photochromic additive (i.e., the length of time which elapses during the change of the composition from the colored state which omits the passage of light having wavelengths around 515 m$\mu$ therethrough, to the colored state which permits the passage of such light) utilized to produce the composition from which the article is made. Slow return rates decrease the scope of useful applications for which the additive may be used because the compound remains colored for too long a time. For example, for a composition to be useful to produce all-hour, all-weather glasses which allow light of about 515 m$\mu$ wavelength to pass therethrough during the night, in shade, or during rainy or cloudy days and prevent the passage of such light therethrough on sunny days, it must have a rate of color change which is very rapid. This is especially true in regard to sunglasses, for example, in that the wearer of the glasses (such as an airlines pilot or a motor vehicle operator) is continually passing from sunny to dark areas and needs maximum vision at all times.

To this end, we have now found a novel group of photochromic compositions which unexpectedly have a return rate far more rapid than known chemically related photochromic compositions and, as such, are useful in many applications wherein commercially available compositions are now relatively useless. More particularly, we have now found a novel group of photochromic compositions produced from various thermoplastic resins and various specific photochromic additives, which compositions are produced from lesser amounts of photochromic additive, and still have a faster return rate than commercial compositions.

These novel photochromic compositions may be utilized in the production of such articles as sunglasses, variable transmission windows, data storage devices and the like. Furthermore, they may be coated on cloth in order to produce graments which afford protection to the wearer in regard to ultraviolet light.

It is therefore an object of the present invention to provide a novel group of photochromic compositions.

It is a further object of the present invention to provide a novel group of photochromic compositions characterized by their ability to change their color upon subjection to irradiation and very rapidly return to their original color when removed therefrom.

It is a further object of the present invention to provide novel compositions of matter comprising various polymeric materials having dispersed throughout the body thereof at least one of the photochromic compounds represented by Formula I, above.

These and other objects will become more apparent to one skilled in the art upon reading the more detailed description of our invention set forth hereinbelow.

PHOTOCHROMISM

Molecules or complexes which undergo reversible photo-induced color changes are termed photochromic systems. That is to say, in the absence of activating radiation, the system has a single stable electronic configuration which has a characteristic absorption spectrum. When the system is contacted with a certain wave length range of light, the absorption spectrum for the system changes drastically, but when the light source is removed, the system spontaneously reverts to its original state or color.

Photochromism has been observed in inorganic and organic compounds both in solution and solid state. Although the exact mechanism of color change varies in each individual system, in many inorganic systems it can be related to one of two possible reaction schemes. The first process is the alteration of the force field around the nucleus of a coordination compound by photo-initiated dissociation, ligand exchange, or isomerization. This alteration can lead to a marked change in the light absorption properties of a molecule.

The second fundamental photo-electronic mechanism generally considered as producing photochromism, is electron delocalization. This mechanism is rapidly reversible in organic molecules and therefore usually produces no colored intermediate. However, in inorganic crystals, photo-initiated electron delocalization from an impurity can lead to a colored state in which the electron is either trapped by a crystal defect to form a color center or otherwise reacts with the crystal host to leave the system in a colored state.

There are three major factors which govern the behavior of a photochromic system.

(A) Absorption of incident radiation

According to the quantum theory, each absorbed quantum creates one activated molecule and only absorbed radiation can produce a chemical change. Variables which control the number of photons absorbed, include the concentration and extinction coefficient of the photochrome, the screening coefficients of other components of the system, and the wavelengths of the incident radiation.

(B) Quantum yield

All excited molecules will not undergo transformation to the activated form, so that the quantum yield will generally be less than unity. Various deactivating processes which compete for the excited molecules include fluorescence, phosphorescence, permanent chemical change and thermal release.

(C) The reverse reaction

In both the forward and reverse reactions, the concentration of the activated form is dependent on the time period, the intensity and the wavelengths of the light, the kinetics of the reverse reactions and the temperature of the system. The kinetics for the reverse reaction will normally be controlling, however, some reverse reactions are thermally sensitive and are accelerated by heating.

THE PHOTOCHROMIC ADDITIVES

By the terms "photochromic compound," "photochromic additive," "photochromic substance," or "photochromic material," as used in the instant disclosure, are meant compounds, substances, additives or materials which change their transmission or reflectance upon being subject to ultraviolet or visible light and subsequently revert to their original state when removed from said light, or treated as described above.

As specified above, our novel photochromic compositions are produced from polymeric materials and various photochromic compounds represented by Formula I. These compounds undergo a variety of color changes upon subjection to visible light of wavelengths of from about 4000 to about 8000 angstroms and rapidly revert to their original color in the dark.

The photochromic compounds are complexes of the metals specified above reacted with the ligands having the structure

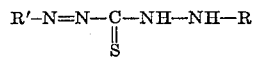

wherein R and R' are as set forth above in regard to Formula I, acting as monobasic acids. The ligand in the complexes may assume either or both of two different structures, depending upon the environment of the complex. More concisely, the ligand, in its normal form, is that set out in Formula I, while the ligand, in its activated form, has the structure:

(II) 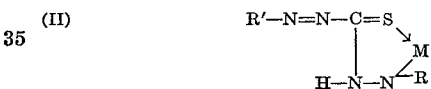

The structure represented by Formula II is responsible for the color change of the compound entrained in the polymeric media.

The above structure of the ligand, in its activated form, is chemically supported by the following observations. The visible spectrum thereof has a strong absorption band in the region of 6000 angstroms, where compounds containing these structures are known to absorb. The large shift in the principal absorption from the inactive form of more than 1000 angstroms is consistent only with a large structural change in the chromophore and not mere cis-trans isomerization. The changes in the infrared spectrum in the N–H stretching and bending, the N–R and the N–C–S vibration modes are consistent with a 1,4-shift of the proton. The thermal return process shows a deuterium isotope effect indicating that a proton transfer is involved.

The photochromic compounds which are utilized to produce our novel compositions by the incorporation thereof in various polymeric media are colored solids, melting in the range of from about 150° C. to about 350° C. They are moderately soluble in common organic solvents such as benzene, toluene, ethyl acetate, acetone, ethanol, methanol, tetrahydrofuran, carbon tetrachloride, chloroform, methylene chloride and the like. They are insoluble in water. They are characterized by having one or more intense, visible absorption bands ($\epsilon > 10^4$) in their solution spectra. The compositions range in color from yellow to green and undergo a light-induced color change and color intensification when subject to visible or ultraviolet light.

Examples of compounds which are represented by Formula I, and which are therefore useful in producing our novel photochromic compositions, include:

bis[(phenylazo)thioformic acid 2-phenylhydrazidato]-Pd(II), Pt(II), Ni(II), Zn(II), Cd(II) and Pb(II);
bis[(phenylazo)thioformic acid 2 - phenylhydrazidato]-Bi(III);

mono[(phenylazo)thioformic acid 2-phenylhydrazidato]-
Ag(I) and Tl(I);
bis[(naphthylazo)thioformic acid 2-naphthylhydrazidato]-
Pd(II), Pt(II), Ni(II), Zn(II), Cd(II) and Pb(II);
tris[(naphthylazo)thioformic acid 2-naphthylhydrazidato]Bi(III);
mono[(naphthylazo)thioformic acid 2-naphthylhydrazidato]Ag(I) and Tl(I);
bis[(tolylazo)thioformic acid 2-tolylhydrazidato]Pd(II), Pt(II), Ni(II), Zn(II), Cd(II) and Pb(II);
tris[(tolylazo)thioformic acid 2-tolylhydrazidato]-
Bi(III);
mono[(tolylazo)thioformic acid 2-tolylhydrazidato]-
Ag(I) and Tl(I);
bis[(p-ethylphenylazo)thioformic acid 2-(p-ethylphenyl)-hydrazidato]Pd(II), Pt(II), Ni(II), Zn(II), Cd(II) and Pb(II);
tris[(p-ethylephenyl)thioformic acid 2-(p-ethylphenyl)-hydrazidato]Bi(III);
mono[(p-ethylphenylazo)thioformic acid 2-(p-ethylphenyl)hydrazidato]Ag(I) and Tl(I);
bis[(o,m-diethylphenylazo)thioformic acid 2-(o,m-diethylphenyl)hydrazidato]Pd(II), Pt(II), Ni(II), Zn(II), Cd(II) and Pb(II);
tris[(o-, m-diethylphenylazo)thioformic acid 2-(o-, m-diethylphenyl)hydrazidato]Bi(III);
mono[(o-, m-diethylphenylazo)thioformic acid 2-(o-, m-diethylphenyl)hydrazidato]Ag(I) and Tl(I);
bis[(p-n-butylphenylazo)thioformic acid 2-(p-n-butylphenyl)hydrazidato]Pd(II), Pt(II), Ni(II), Zn(II), Cd(II) and Pb(II);
tris[(p-n-butylphenylazo)thioformic acid 2-(p-n-butylphenyl)hydrazidato]Bi(III);
mono[(p-n-butylphenylazo)thioformic acid 2-(p-n-butylphenyl)hydrazidato]Ag(I) and Tl(I);
bis[(p-nitrophenylazo)thioformic acid 2-(p-nitrophenyl)-hydrazidato]Pd(II), Pt(II), Ni(II), Zn(II), Cd(II) and Pb(II);
bis[(o-nitrophenylazo)thioformic acid 2-(o-nitrophenyl)-hydrazidato]Pt(II), Pd(II), Ni(II), Zn(II), Cd(II) and Pb(II);
bis[(p-chlorophenylazo)thioformic acid 2-(p-chlorophenyl)hydrazidato]Ni(II);
mono[(o-bromophenylazo)thioformic acid 2-(o-bromophenyl)hydrazidato]Ag(I) and Tl(I);
bis[(m-iodophenylazo)thioformic acid 2-(m-iodophenyl)-hydrazidato]Zn(II);
bis[(o-fluorophenylazo)thioformic acid 2-(o-fluorophenyl)hydrazidato]Pb(II);
tris[(p-bromophenylazo)thioformic acid 2-(bromophenyl)hydrazidato]Bi(III);
bis[(p-methoxyphenyl)thioformic acid 2-(p-methoxyphenyl)hydrazidato]Pt(II);
mono[(p-nitrophenylazo)thioformic acid 2-(p-nitrophenyl)hydrazidato]Ag(I) and Tl(I);
tris[(p-nitrophenylazo)thioformic acid 2-(p-nitrophenyl)-hydrazidato]Bi(III);
mono[(o-ethoxyphenyl)thioformic acid 2-(o-ethoxyphenyl)hydrazidato]Ag(I);
mono[(m-propoxyphenyl)thioformic acid 2-(m-propoxyphenyl)hydrazidato]Tl(I);
tris[(p-butoxyphenyl)thioformic acid 2-(p-ethoxyphenyl)-hydrazidato]Bi(III);
bis[(p-methoxycarbonylphenyl)thioformic acid 2-(o-butoxyphenyl)hydrazidato]Pd(II);
bis[(m-pentoxycarbonylphenyl)thioformic acid 2-(m-propoxyphenyl)hydrazidato]Pt(II);
mono[(p-butoxycarbonylphenyl)thioformic acid 2-(p-butoxyphenyl)hydrazidato]Ag(I);
bis[(p-phenyloxyphenyl)thioformic acid 2-(o-butoxyphenyl)hydrazidato]Ni(II);
bis[(o-hydroxyphenyl)thioformic acid 2-(o-methoxyphenyl)hydrazidato]Zn(II);
bis[(m-carboxyphenyl)thioformic acid 2-(p-hydroxyphenyl)hydrazidato]Zn(II);
bis[(o-formamidophenyl)thioformic acid 2-(m-chlorophenyl)hydrazidato]Zn(II);
bis[(2-methyl-1-naphthylazo)thioformic acid 2-(2-methyl-1-naphthyl)hydrazidato]Pd(II), Pb(II), Ni(II), Zn(II), and Cd(II);
mono[(2-n-butyl-1-naphthylazo)thioformic acid 2-(3-n-butyl-2-naphthyl)hydrazidato]Ag(I) and Tl(I);
tris[(2-methoxycarbonyl-1-naphthyl)thioformic acid 2-(2-methoxycarbonyl-1-naphthyl)hydrazidato]Bi(III);
bis[(3-n-butoxycarbonyl-2-naphthyl)thioformic acid 2-(2-n-butoxycarbonyl-1-naphthyl)hydrazidato]Pt(II); Pb(II), Zn(II), Cd(II) and Ni(II);
mono[(2-pentoxycarbonyl-1-naphthyl)thioformic acid 2-(p-chlorophenyl)hydrazidato]Tl(I) and Ag(I);
bis[(4-biphenylylazo)thioformic acid 2-(4-biphenylyl)hydrazidato]Pd(II), Pb(II), Ni(II), Zn(II) and Cd(II);
tris[(p-1-naphthylphenylazo)thioformic acid 2-(p-1-naphthylphenyl)hydrazidato]Bi(III);
mono[(2-phenyl-1-naphthylazo)thioformic acid 2-(2-phenyl-1-naphthyl)hydrazidato]Ag(I) and Tl(I);
bis[3 - naphthyl-2-naphthylazo)thioformic acid 2-(4-biphenylyl)hydrazidato]Pd(II), Pb(II), Ni(II), Zn(II) and Cd(II);
tris[(p-carboxyphenylazo)thioformic acid 2-(p-carboxyphenyl)hydrazidato]Bi(III);
mono[[o-(3-carboxypropyl)phenylazo]thioformic acid 2-[o-(3-carboxypropyl)hydrazidato]]Ag(I) and Tl(I);
bis[(p-anilinophenylazo)thioformic acid 2-(p-anilinophenyl)hydrazidato]Pd(II), Pb(II), Ni(II), Zn(II) and Cd(II);
tris[(2-anilino-1-naphthylazo)thioformic acid 2-(2-anilino-1-naphthyl)hydrazidato]Bi(III);
mono[(p-1-naphthylaminophenylazo)thioformic acid 2-(p-carboxyphenyl)hydrazidato]Ag(I) and Tl(I);
bis[(p-o-toluidinophenylazo)thioformic acid 2-(p-anilinophenyl)hydrazidato]Pd(II), Pb(II), Ni(II), Zn(II) and Cd(II);
tris[(m-phenoxyphenylazo)thioformic acid 2-(o-phenoxyphenyl)-hydrazidato]Bi(III);
mono[(p-tolyloxyphenylazo)thioformic acid 2-(p-tolyloxyphenyl)hydrazidato]Ag(I) and Tl(I);
bis[(p-naphthyloxyphenylazo)thioformic acid 2-(p-phenoxyphenyl)hydrazidato]Pd(II), Pb(II), Ni(II), Zn(II) and Cd(II);
tris[(2-phenoxynaphthylazo)thioformic acid 2-(2-tolyloxynaphthyl)hydrazidato]Bi(III);
mono[(p-acetylphenylazo)thioformic acid 2-(o-propionylphenyl)hydrazidato]Ag(I) and Tl(I);
bis[(4-butyryl-1-naphthylazo)thioformic acid 2-(p-acetylphenyl)hydrazidato]Pd(II), Pb(II), Ni(II), Zn(II) and Cd(II);
tris[(o-valerylphenylazo)thioformic acid 2-(8-octanoyl-2-naphthyl)hydrazidato]Bi(III);
mono[(m-benzoylphenylazo)thioformic acid 2-(p-benzoylphenyl)hydrazidato]Ag(I) and Tl(I);
bis[[o-(2,4-dimethylbenzoyl)phenylazo]thioformic acid 2-[p-(2,3,4-trimethylbenzoyl)phenyl]hydrazidato] Pd(II), Pb(II), Ni(II),Zn(II) and Cd(II);
tris[(p-naphthoylphenylazo)thioformic acid 2-(p-naphthoylphenyl)hydrazidato]Bi(III);
bis[(2-naphthoyl-1-naphthylazo)thioformic acid 2-(m-phenoxyphenyl)hydrazidato]Ni(II);
mono[(m-acetamidophenylazo)thioformic acid 2-(p-acetamidophenyl)hydrazidato]Ag(I) and Tl(I);
tris[(2-propionamido-1-naphthylazo)thioformic acid 2-(o-butyramidophenyl)hydrazidato]Bi(III);
bis[(m-valeramidophenylazo)thioformic acid 2-(5-benzamido-1-naphthyl)hydrazidato]Zn(II);
bis[(p-naphthamidophenylazo)thioformic acid 2-(p-carboxyphenyl)hydrazidato]Cd(II);
bis[(p-carboxymethylphenylazo)thioformic acid 2-[2-(2-carboxyethyl)-1-naphthyl]hydrazidato]Pt(II);
mono[[p-(3-carboxypropyl)phenylazo]thioformic acid 2-(1-tetralyl-2-naphthyl)hydrazidato]Tl(I);

tris[[p-(5-tetralyl)phenylazo]thioformic acid 2-[2-(6-tetralyl)naphthyl]hydrazidato]Bi(III);
mono[[p-(perfluoromethylthio)phenylazo]thioformic acid 2-[p-(perfluorobutylthio)phenyl]hydrazidato]Ag(I);
mono[[1-(perfluoroethylthio)naphthylazo]thioformic acid 2-[m-(methylthio)phenyl]hydrazidato]Tl(I);
bis[(2-methyl-1-naphthylazo)thioformic acid 2-[p-(butylthio)phenyl]hydrazidato]Pb(II);
mono[(2-nitro-1-naphthylazo)thioformic acid 2-(7-nitro-1-naphthyl)hydrazidato]Ag(I);
bis[(p-sulfamoylphenylazo)thioformic acid 2-(p-sulfamoylphenyl)hydrazidato]Pb(II);
bis[(o-sulfamoylphenylazo)thioformic acid 2-(o-sulfamoylphenyl)hydrazidato]Pt(II);
mono[(1-sulfamoyl-2-naphthylazo)thioformic acid 2-(1-sulfamoyl-2-naphthyl)hydrazidato]Tl(I);
tris[(m-sulfophenylazo)thioformic acid 2-(m-sulfophenyl)hydrazidato]Bi(III);
bis[(p-sulfophenylazo)thioformic acid 2-(2-sulfo-1-naphthyl)hydrazidato]Ni(II);
bis[(4-sulfo-2-naphthylazo)thioformic acid 2-(4-sulfo-2-naphthyl)hydrazidato]Cd(II);
bis[(1-chloro-2-naphthylazo)thioformic acid 2-(1-chloro-2-naphthyl)hydrazidato]Pb(II);
mono[(3-bromo-1-naphthylazo)thioformic acid 2-(3-bromo-1-naphthyl)hydrazidato]Ag(I);
tris[(2-iodo-1-naphthylazo)thioformic acid 2-(2-iodo-1-naphthyl)hydrazidato]Bi(III);
bis[(7-fluoro-2-naphthylazo)thioformic acid 2-(7-fluoro-2-naphthyl)hydrazidato]Pt(II);
bis[(2-methoxy-1-naphthylazo)thioformic acid 2-(2-methoxy-1-naphthyl)hydrazidato]Cd(II);
bis[(4-ethoxy-1-naphthylazo)thioformic acid 2-(4-ethoxy-1-naphthyl)hydrazidato]Ni(II);
mono[(5-propoxy-2-naphthylazo)thioformic acid 2-(2-methoxy-1-naphthyl)hydrazidato]Tl(I);
tris[(8-butoxy-1-naphthylazo)thioformic acid 2-(2-chloro-1-naphthyl)hydrazidato]Bi(II);
bis[(p-aminophenylazo)thioformic acid 2-(o-aminophenyl)hydrazidato]Zn(II);
mono[(3-amino-1-naphthylazo)thioformic acid 2-(4-amino-2-naphthyl)hydrazidato]Ag(I);
tris[(p-hydroxyphenylazo)thioformic acid 2-(p-hydroxyphenyl)hydrazidato]Bi(III);
mono[(m-hydroxyphenylazo)thioformic acid 2-(m-hydroxyphenyl)hydrazidato]Tl(I);
bis[(2-hydroxy-1-naphthylazo)thioformic acid 2-(2-hydroxy-1-naphthyl)hydrazidato]Ni(II);
bis[(4-methylthio-1-naphthylazo)thioformic acid 2-(4-methylthio-1-naphthyl)hydrazidato]Cd(II);
mono[(2-butylthio-1-naphthylazo)thioformic acid 2-(2-butylthio-1-naphthylhydrazidato]Ag(I);
bis[(p-methylaminophenylazo)thioformic acid 2-(p-methylaminophenyl)hydrazidato]Cd(II);
mono[(m-butylaminophenylazo)thioformic acid 2-(m-butlyaminophenyl)hydrazidato]Tl(I);
bis[(2-methylamino-1-naphthylazo)thioformic acid 2-(2-methylamino-1-naphthyl)hydrazidato]Pt(II);
bis[(3-butylamino-1-naphthylazo)thioformic acid 2-(3-butylamino-1-naphthyl)hydrazidato]Pb(II);
and the like.

The thiocarbazones from which the metal complexes utilized in this invention are prepared may be obtained by any known procedure. One method comprises the oxidation of the corresponding thiocarbazides by air in alkalinesolution or hydrogen peroxide.

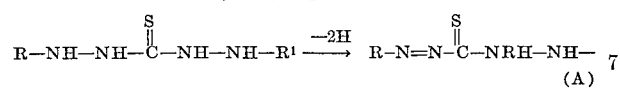
(A)

Additionally, they may be synthesized by any one of the following three methods:

(1) Formation of the substituted hydrazine salt of the 3-substituted dithiocarbazoic acid resulting from the reaction of the monosubstituted hydrazines with carbon disulfide followed by the thermal elemination of hydrogen sulfide;

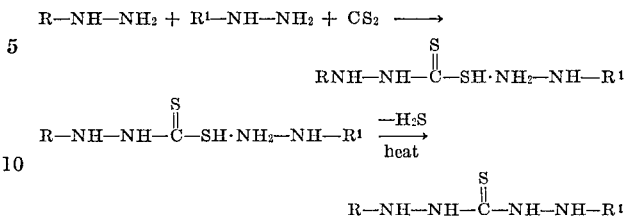

[D. S. Tarbell et al., J. Am. Chem. Soc., 70, 1381 (1948)]

(2) Reaction of the monosubstituted hydrazine with thiophosgene to give the 3-substituted thiocarbazoyl chloride, which is then reacted with the second monosubstituted hydrazine in the presence of a base to give the product,

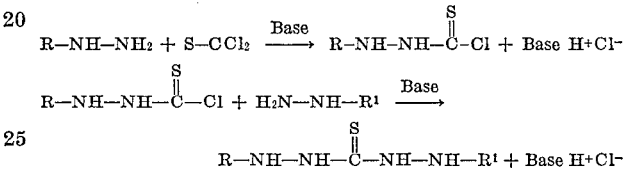

[Bamberger, Ber., 33, 2043 (1900); ibid, 27, 155 (1894)]

(3) Nitroformazyl Method—Two moles of diazonium compounds are coupled with sodionitromethane. The resulting nitroformazyl is reduced with ethanolic ammonium sulfide to the thiocarbazide,

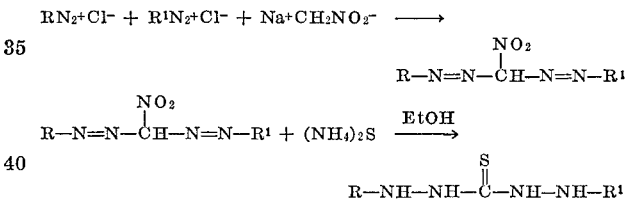

Bamberger, Ber., 33, 2043 (1900); ibid., 27, 155 (1894). Bamberger, Ann., 446, 260 (1926). Hubbard and Scott, J. Am. Chem. Soc., 65, 2390 (1943).

The pH of an aqueous solution of a necessary number of equivalents of a salt of the metal M ($NO_2$, $SO_4$, etc.) is adjusted to the optimum extraction pH. The resulting mixture is extracted with a $CHCl_3$ solution of an equal number of moles of (A). The mixture is agitated until no unreacted (A) can be observed. The organic phase is then evaporated to dryness and the complex is recovered. Sandell, Colorimetric Determination of Traces of Metal, Interscience, N.Y., 1959.

THE POLYMERIC MATERIALS

The photochromic compounds represented by Formula I, above, are incorporated into various polymeric materials to produce our novel compositions of matter, which are useful for the applications described above, and which constitute the present invention. That is to say, the photochromic compounds, set forth hereinabove, may be incorporated into such materials as acrylic and methacrylic polymers, styrene polymers, vinyl halide polymers, cyanoethylated cellulosic materials, aminoplast resins, polyester resins, cellulose acetate polymers such as cellulose acetate butyrate, etc., nitro cellulose, cellulosepropionate, and cured epoxy-type polymers and the like. The resultant compositions of matter may be formed into such articles as discs, plates, films, and the like, by any known molding, casting, spray drying etc. technique. Since the color change of the photochromic compounds is evidenced in the solid state, the use of laminated articles and/or encapsulated photochromic solutions such as predominantly used heretofore without to much success, have been obviated by our novel compositions.

The various esters of acrylic acid and methacrylic acid which may be used to form the polymers comprising the major constituent of our novel photochromic compositions are those having the formula (III)
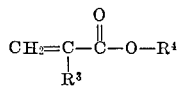

wherein $R^3$ is hydrogen or a methyl radical and $R^4$ is an alkyl radical having from 1 to 6 carbon atoms, inclusive. Compounds which are represented by Formula III and consequently may be used in the present invention include methyl acrylate, ethyl acrylate, n-propyl acrylate, isopropyl acrylate, n-butyl acrylate, isobutyl acrylate, t-butyl acrylate, amyl acrylate, hexyl acrylate, methyl methacrylate, ethyl methacrylate, n-propyl methacrylate, isopropyl methacrylate, n-butyl methacrylate, isobutyl methacrylate, t-butyl methacrylate, amyl methacrylate, hexyl methacrylate and the like.

The acrylic and methacrylic acid esters may be polymerized alone or in combination with other ethylenically unsaturated monomers in amounts such that the final polymer has a preponderance of the acrylic or methacrylic acid ester therein, i.e., at least 51%, by weight, based on the total weight of the monomers. Comonomers useful for this purpose are set forth hereinbelow.

The styrene monomers, which may also be employed to produce the novel compositions of the present invention, are those having the formula (IV)
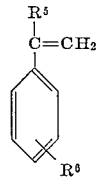

wherein $R^5$ is hydrogen or a lower alkyl radical having 1 to 4 carbon atoms, inclusive, and $R^6$ is hydrogen, a lower alkyl radical having 1 to 4 carbon atoms, inclusive, or a halogen radical. Suitable monomers represented by Formula IV include styrene, methyl styrene, ethyl styrene, propyl styrene, butyl styrene, chloro styrene, bromo styrene, fluoro styrene, iodo styrene, α-methyl styrene, α-ethyl styrene, α-butyl styrene, α-methyl methylstyrene, α-methyl ethylstyrene, α-butyl ethylstyrene, α-ethyl chlorostyrene, α-propyl iodostyrene and the like.

These styrene monomers may also be polymerized alone or in combination with other ethylenically unsaturated monomers in amounts equivalent to those set forth hereinabove in regard to the methacrylic and acrylic acid esters.

The vinyl halide monomers which may be used to produce the novel compositions of the present invention are well known in the art and generally vinyl chloride is the most practical for reasons of availability and cost. However, vinyl fluoride has become more important in recent years and its use is also contemplated herein. These vinyl halide polymers may be used as pure homopolymers, however, inasmuch as commercially available polymeric vinyl halide resins generally are produced containing minor amounts, i.e., up to about 2.0% of copolymeric material, resins of this sort are also applicable herein. Commercially available poly(vinyl chloride) also, for example, may contain about 1.0% or less of other constituents such as vinyl acetate, in copolymeric form. These polymers are also useful herein. These vinyl halides may additionally be employed with varying amounts of comonomers, generally in amounts as indicated above in regard to the esters of acrylic and methacrylic acids.

Examples of applicable comonomeric compounds which may be copolymerized with the acrylates, styrenes and vinyl halides set forth hereinabove in amounts less than about 50%, by weight, based on the total weight of the monomers, include the unsaturated alcohol esters, more particularly the allyl, methallyl, crotyl, 1-chloroallyl, 2-chloroallyl, cinnamyl, vinyl, methvinyl, 1-phenylallyl, butenyl, etc., esters of saturated and unsaturated aliphatic and aromatic monobasic and polybasic acids such, for instance, as acetic, propionic, butyric, valeric, caproic, crotonic, oxalic, malonic, succinic, glutaric, adipic, pimelic, suberic, azelaic, sebacic, citraconic, mesaconic, itaconic, acetylene dicarboxylic aconitic, benzoic, phenylacetic, phthalic, terephthalic, benzoylphthalic, etc., acids; the saturated monohydric alcohol esters, e.g., the methyl, ethyl, propyl, isopropyl, butyl, sec.-butyl, amyl, etc.; esters of ethylenically unsaturated aliphatic monobasic and polybasic acids, illustrative examples of which appear above, vinyl cyclic compounds (including monovinyl aromatic hydrocarbons), e.g., styrene, o-, m-, and p-chlorostyrenes, -bromostyrenes, -fluorostyrenes, -methylstyrenes, -ethylstyrenes, -cyanostyrenes, the various polysubstituted styrenes such, for example, as the various di-, tri-, and tetra-chlorostyrenes, -bromostyrenes, -fluorostyrenes, -methylstyrenes, -ethylstyrenes, -cyanostyrenes, etc., vinyl naphthalene, vinyl-cyclohexane, vinyl furane, vinyl pyridine, vinyl dibenzofuran, divinyl benzene, trivinyl benzene, allyl benzene, diallyl benzene, N-vinyl carbazole, the various allyl cyanostyrenes, the various alpha-substituted styrenes and alpha-substituted ring-substituted styrenes, e.g., alpha-methyl styrene, alpha-methyl-para-methyl styrene, etc.; unsaturated ethers, e.g., ethyl vinyl ether, diallyl ether, ethyl methallyl ether, etc.; unsaturated amides, for instance, N-allyl -caprolactam, acrylamide, and N-substituted acrylamides, e.g., N-methylol acrylamide, N-allyl acrylamide, N-methyl acrylamide, N-phenyl acrylamide, etc.; unsaturated ketones, e.g., methyl vinyl ketone, methyl allyl ketone, etc.; methylene malonic esters, e.g., methylene methyl malonate, etc.; ethylene; unsaturated polyhydric alcohol (e.g., butenediol, etc.) esters of saturated and unsaturated, aliphatic and aromatic, monobasic and polybasic acids.

Other examples of monomers that can be copolymerized are the vinyl halides, more particularly, vinyl fluoride, vinyl chloride, vinyl bromide and vinyl iodide, and the various vinylidene compounds, including the vinylidene halides, e.g. vinylidene chloride, vinylidene bromide, vinylidene fluoride, and vinylidene iodide, other comonomers being added if needed in order to improve the compatibility and copolymerization characteristics of the mixed monomers.

More specific examples of allyl compounds, that can be copolymerized are allyl alcohol, methallyl alcohol, diallyl carbonate, allyl lactate, allyl alphahydroxyisobutyrate, allyl trichlorosilane, diallyl methylgluconate, diallyl tartronate, diallyl tartrate, diallyl mesaconate, the diallyl ester of muconic acid, diallyl chorophthalate, diallyl dichlorosilane, the diallyl ester of endomethylene tetrahydrophthalic anhydride, triallyl tricarballylate, triallyl cyanurate, triallyl citrate, triallyl phosphate, tetrallyl silane, tetrallyl silicate, hexallyl disiloxane, etc. Other examples of allyl compounds that may be employed are given, for example, in U.S. Pat. No. 2,510,503, issued June 6, 1950.

Among the monomers which are preferred for use in carrying our invention into effect are, for example, compounds such as acrylonitrile, and other compounds, e.g., the various substituted acrylonitriles (e.g., methacrylonitrile, ethacrylonitrile, phenylacrylonitrile, etc.), the various N-substituted acrylamides and alkacrylamides, for instance, N-dialkyl acrylamides and methacrylamides, e.g., N-dimethyl, -diethyl, -dipropyl, -dibutyl, etc., acrylamides and methacrylamides and the like.

The cyanoethylated cellulosic materials employed in the formation of the novel compositions of the present invention may be prepared from the cellulose of wood pulp or wood fiber after removal of the lignin and the like therefrom. Additionally, α-cellulose flock, regenerated cellulose fibers such as viscose, cotton linters, and natural cellulose materials such as cotton, jute, ramie, and linen may be used in such forms as fibers, yarns, fabrics, raw stock, batting and the like. Additionally, the cellulosic material may be non-fibrous, e.g., in the form of felted or webbed materials. The fibrous forms of the cellulose may be employed in woven or knitted condition. It is also within the scope of the present invention to employ methyl cellulose, ethyl cellulose, and the like as the starting material.

The cyanoethylation of the cellulosic materials may be carried out by reacting the natural or regenerated cellulosic material with acrylonitrile in various ways. The physical properties of the resultant products will vary with the nature of the cellulosic material, its molecular weight, the method of treatment and the like. However, said properties are affected most noticeably by the extent to which the cellulosic material has been cyanoethylated.

The cyanoethylation of the cellulosic material is usually defined in one of two ways, i.e., either by its nitrogen content, expressed in weight percent of nitrogen, or by a decimal fraction representing the number of cyanoethyl groups introduced per anhydroglucose unit. This decimal fraction is usually referred to as the "degree of substitution." Complete cyanoethylation of cellulose generally corresponds to a nitrogen content of about 13.1% or slightly above, and a degree of substitution of about 3. A nitrogen content of at least 10% and a corresponding degree of substitution of about 2.3 is generally present in the most commonly available materials.

At low degrees of substitution, that is, a degree of substitution up to about 2, cyanoethylation does not greatly alter the solubility or the physical appearance of the cellulose, i.e., the fibrous characteristics thereof are generally retained. However, as the degree of substitution increased progressively above 2, the fibrous characteristics of the cellulose gradually diminish and resemblances of the product to a thermoplastic resin, become increasingly apparent. Additionally, the product develops a solubility in certain organic solvents which the cellulosic material did not have.

As mentioned above, substantially any cellulosic material can be utilized in the production of our novel compositions of the present invention. Cellulose, and some chemically related compounds, are structurally polymers of anhydroglucose, and different polymers are generally classed in terms of the number of anhydroglucose units in a molecule. Chemically, an anhydroglucose unit is a trihydric alcohol, one hydroxyl group being a primary hydroxyl and the other two being secondary. Celluloses are predominately 1 to 4 unit polymers, the number of polymerized units usually being referred to as the degree of polymerization.

As with any other polymer, each cellulosic polymer is a mixture of polymers of different molecular weight and it is the average degree of polymerization which determines the classification of the ultimate product. The celluloses used in the present invention generally have a degree of polymerization of at least about 2000, although those celluloses having degrees of polymerization below 2000 are also useful herein. The viscose rayons for example, have a degree of polymerization of from about 250 to 350. Natural cotton has a degree of polymerization of about 850 to 1000 and many wood pulp derivatives have a degree of polymerization in excess of 1000. All these celluloses however, may be used in the practice of the present invention.

The cyanoethylation procedures used to form the starting composition of the present invention do not form part of the instant invention and any known procedure for achieving this result may be employed. One such method is shown for example, in U.S. Pat. No. 2,332,049. Additional procedures are shown in the following U.S. Patents: 2,375,847, 2,840,446, 2,786,736, 2,860,946, 2,812,999 and these patents are hereby incorporated herein by reference.

In general, the procedure for preparing the cyanoethylated celluloses involves reacting a cellulosic material with acrylonitrile in the presence of an alkali and precipitating and washing the resultant cyanoethylated product. Generally, the amount of acrylonitrile which is used is 10–20 times the amount of cellulosic material being treated. The particular alkali employed is not critical and such materials as potassium hydroxide and sodium hydroxide may be used. A good general procedure is to employ about 2.5 to about 7.0 weight percent of alkali, based on the weight of the cellulosic material.

The aminoplast resins employed in the practice of the present invention are synthetic resins prepared by the condensation reaction of an amino (including imino) or amido (including imido) compound with an aldehyde. Resinous condensates of this type, as well as methods for their preparation, have been shown innumerable times in the prior art, and adequate disclosures of them may be found in, for example, U.S. Pats. Nos. 2,197,357; 2,310,004, and 2,328,592 to Widmer et al. and 2,260,239 Talbot. The present invention is concerned particularly with aminoplast resins of the type wherein one or more aminotriazines containing at learst two amidogen groups, each having at least one aldehyde reactable hydrogen atom attached to the amidogen nitrogen atom, e.g., melamine, have been reacted with an aldehyde, such as formaldehyde, to yield a thermosetting resinous condensate, i.e., one which has been carried to an intermediate stage of condensation whereby it remains as a resinous material soluble or readily dispersible in aqeuous systems while also remaining capable of being converted, under suitable conditions of heat and pressure, to a substantially insoluble and infusible form.

Melamine is the preferred aminotriazine reactant for preparing the heat-curable or potentially heat-curable partially polymerized aminotriazine-aldehyde resinous reaction products which are used in the practice of the present invention, but other aminotriazines, e.g., mono-, di-, and tri-substituted melamines, such as the mono-, di- and trimethylmelamines, and the like, guanamines, such as formoguanamine, acetoguanamine, benzoguanamine, and the like, as well as mixtures of aminotriazines, may be utilized as reactants. Similarly, formaldehyde, preferably in aqueous solution, is the preferred aldehyde reactant, but other aldehydes, e.g., acetaldehyde propionaldehyde, butyraldehyde, benzaldehyde, and the like, or compounds engendering aldehydes, e.g., paraformaldehyde, hexamethylenetetramine, and the like, may also be employed. The properties desired in the finished product and economic considerations are among the elements which will determine the choice of the particular aminotriazine and aldehyde employed.

The mol ratio of aldehyde to aminotriazine in such resinous reaction products is not critical, and may be within the order of from about 1.5:1 to about 4:1, respectively, depending on the nature of the starting materials and the characteristics desired in the final product, but it is preferred that the mol ratio be within the order of from about 2:1 to about 3:1, respectively.

Conventional reaction conditions are observed in preparing the aminotriazine-aldehyde resins, i.e., the aldehyde and aminotriazine may be heat-reacted at temperatures ranging from about 40° C. to reflux temperature, i.e. about 100° C., for periods of time ranging from about 30 to 120 minutes, at a pH ranging from about 7.0 to 10, preferably in an aqueous medium. Any substance yielding acidic or alkaline aqueous solutions may be used to regulate the pH, for example, alkaline materials such as alkali metal or alkaline earth metal oxides, e.g., sodium, potassium or calcium hydroxide or sodium or potassium carbonate; mono-, di-, or tri-alkylamines, e.g., ethanolamine, triethylamine or triethanolamine; alkylene polyamines or polyakylene polyamines, e.g., 3,3'-iminobispropylamine, and the like.

Other amido or imido compounds having at least two aldehyde-reactable hydrogen atoms attached to amidogen nitrogen atoms may also be used in preparing the aminoplast resins used in the present invention. For example, urea and those of its derivatives which have been commonly used in the preparation of aminoplast resinous compositions, such as for example the alkylureas, e.g., mono- and dimethylurea, halourea and the like may be used.

The properties of the thermosetting aminoplast resins can be further modified, if desired, by incorporating various other substances into the aminotriazine-aldehyde resin. Included among such substances are plasticizers such as the α-alkyl-D-glucosides, e.g., α-methyl-D-glucoside, disclosed in U.S. Pat. No. 2,773,848 to Lindenfelser, methylol derivatives corresponding to the general formula:

(V) 

wherein $R^7$ represents an alkyl, aryl, or aralkyl group, $R^8$ represents a hydrogen atom or an alkyl, alkylol, aryl or acyl group, and X represents,

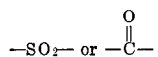

e.g., N-methylol p-toluenesulfonamide (which may be formed in situ by the addition of p-toluenesulfonamide to an amidogen-formaldehyde reaction mixture) and the like, or combinations of these glucosides and methylol derivatives, e.g., a mixture of α-methyl-D-glucoside and p-toluenesulfonamide, as disclosed in U.S. Pat. No. 2,773,788 to Magrane et al.

The aminoplast resinous molding materials may be prepared by first impregnating a fibrous filler, such as chopped α-cellulose, with an aminoplast resin, in syrup form, drying the impregnated material to a low volatile content, usually in the order of about 10% or less, converting the dried material to a fine, fluffy powder while blending it with various commonly employed additives, such as curing catalysts, pigments, mold lubricants, and the like, and finally densifying and granulating the powdered molding composition, thus converting it to a form especially suited for commercial molding techniques and to which my novel photochromic material may be added.

The polyester resins employed in the practice of the present invention may be either thermoplastic or thermosetting. They are all relatively well known in the art and are prepared by reacting polycarboxylic acids, or their anhydrides, with polyhydric alcohols. The thermosetting polyesters are prepared using a procedure wherein at least one of the rective components contains α,β-ethylenic unsaturation. By following this procedure, resinous, essentially linear esterification or condensation products containing a plurality of ethylenically unsaturated linkages distributed along the backbones of their polymer chains are produced.

The use of α,β-ethylenically unsaturated polycarboxylic acids provides a convenient method of introducing ethylenic unsaturation into the polyester resins. It is preferred to employ α,β-ethylenically unsaturated dicarboxylic acids, such as maleic, fumaric, citraconic, γ,γ-dimethylcitraconic, mesaconic, itaconic, α-methylitaconic, γ-methylitaconic, teraconic, and the like, as well as mixtures thereof, but minor amounts of α,β-ethylenically unsaturated polycarboxylic acids containing three or more carboxyl groups, such as aconitic acid and the like, together with the particular α,β-ethylenically unsaturated dicarboxylic acid or acids chosen, may also be used.

Whenever available, the anhydrides of any of the aforementioned α,β-ethylenically unsaturated polycarboxylic acids may be substituted for said acids in whole or in part.

Any of the large class of polyhydric alcohols ordinarily used in preparing reactive polyester resins may be employed in the practice of the present invention. While dihydric alcohols, and especially saturated aliphatic diols, are preferred as co-reactants in the preparation of the polyester resins, it is not mandatory that all of the polyol used be of this type, in that small amounts, e.g., usually up to about 10% of the total equivalents of hydroxyl groups present in the esterification mixture, of polyols having more than two hydroxyl groups may also be employed. Among the dihydric alcohols which may be employed are saturated aliphatic diols such as ethylene glycol, propylene glycol, butylene glycol, diethylene glycol, dipropylene glycol, triethylene glycol, tetraethylene glycol, butanediol-1,2, butanediol-1,3, butanediol-1,4, pentanediol-1,2, pentanediol-1,3, pentanediol-1,4, pentanediol-1,5, hexanediol-1,2, hexanediol-1,3, hexanediol-1,4, hexanediol-1,5, hexanediol-1,6, neopentyl glycol and the like, as well as mixtures thereof. Among the polyols having more than two hydroxyl groups which may be employed in minor amounts, together with the abovementioned diols, are saturated aliphatic polyols such as glycerol, trimethylol ethane, trimethylol propane, pentaerythritol, dipentaerythritol, arabitol, xylitol, dulcitol, adonitol, sorbitol, mannitol, and the like, as well as mixtures thereof.

In forming the thermoplastic polyester resins useful herein, the above alcohols are reacted with non-polymerizable polycarboxylic acids, i.e., acids which are saturated or which contain only benzenoid unsaturation, such as oxalic, malonic, succinic, glutaric, adipic, pimelic, suberic, azelaic, sebacic, malic, tartaric, tricarballylic, citric, phthalic, isophthalic, terephthalic, cyclohexanedicarboxylic, endomethylenetrahydrophthalic, and the like, as well as mixtures thereof.

These saturated acids may be used alone to form thermoplastic resins or in combination with the above-mentioned unsaturated acids in the formation of thermosetting resins in order to impart many beneficial properties thereto. For example, nonpolymerizable polycarboxylic acids having only two carboxyl groups, and no other reactive substituents, may be employed to impart a desirable degree of flexibility which may not be achieved by the use of the α,β-ethylenically unsaturated polycarboxylic acids alone. Where such nonpolymerizable polycarboxylic acids are employed, the amount thereof should constitute at least about 20% but not more than about 80% of the total equivalents of carboxyl groups present in the esterification mixture. Preferably, such nonpolymerizable polycarboxylic acids may be employed in amounts ranging from about 25% to about 75% of the total equivalents of carboxyl groups present in the esterification mixture.

Halogenated unsaturated polycarboylic acids may also be employed in the preparation of the thermosetting polyester resins of the present invention for purposes of imparting various desirable properties thereto as mentioned above in regard to the saturated acids. Examples of halogenated acids which may be used include monochloro- and monobromomaleic, monochloro- and monobromofumaric, monochloro- and monobromomalonic, dichloro- and dibromomalonic, monochloro- and monobromosuccinic, α,β-dichloro- and dibromosuccinic, hexachloroendomethylene-tetrahydrophthalic, and the like, as well as mixtures thereof. Whenever available, the anhydrides of any of these halogenated acids may also be substituted therefore in whole or in part.

Among the halogenated polyols that may be employed are 2,2'-chloromethylpropanediol-1,3, adducts of hexachlorocyclopentadiene with unsaturated polyols, such as butenediols, pentenediols, and the like, and adducts of hexachlorocyclopentadiene with polyols having three or more hydroxyl groups, one of which is etherified with an unsaturated alcohol reactive with hexachlorocyclopentadiene. Among the latter are compounds such as 3-[1,4,-5,6,7,7-hexachlorobicyclo - (2.2.1) - 5 - hepten-2-yloxyl]-1,2-propanediol, which is the adduct of hexachlorocyclopentadiene with vinyl glycerol ether, 3-[1,4,5,6,7,7-hexachlorobicyclo-(2.2.1)-5-hepten-2-yl]-methoxy - 1,2 - propanediol, which is the adduct of hexachlorocyclopentadiene with allyl glycerol ether, adducts of hexachlorocyclopentadiene with vinyl and allyl ethers of pentaerythritol, and the like. Mixtures of these halogenated polyols may also be employed, if desired.

The esterification mixtures, from which both the thermoplastic and the thermosetting polyester resins employed in the practice of the present invention are prepared, are generally formulated so as to contain at least a stoichiometric balance between carbonyl and hydroxyl groups. Thus, where a diol and a dicarboxylic acid are employed, they are usually reacted on at least a mol to mol basis. In common commercial practice, a small excess of polyol, usually in the range of from about 5% to about 15% excess, is employed. This is done primarily for economic reasons, i.e., to insure a rapid rate of esterification.

Both types of polyester resins used in the practice of the present invention are formed in the manner customarily observed in the art. Thus, the particular polycarboxylic acid or acids and polyol or polyols employed are reacted at elevated temperatures and atmospheric pressure. Since resinifying reactants of this type are prone to develop undesirable color when in contact with air at elevated temperatures, it is generally considered good practice to conduct the esterification reaction in an inert atmosphere, such as can be obtained by bubbling an inert gas, e.g., carbon dioxide, nitrogen, and the like, through the esterification mixture. The reaction temperature is not critical, thus the reaction will preferably be carried out at a temperature which usually will be just below the boiling point of the most volatile component of the reaction mixture, generally the polyol.

The esterification mixture should be sufficiently reacted so as to ultimately produce a polyester resin having an acid number not appreciably more than about 75. It is preferred to employ polyester resins having acid numbers ranging from about 30 to about 50.

Further details pertaining to the preparation of polyester resins of the types employed in the practice of the present invention are disclosed in U.S. Pat. No. 2,255,313, to Ellis, and in U.S. Pats. Nos. 2,443,735 to 2,443,741, inclusive, to Kropa and these patents are hereby incorporated into the present application by reference.

The thermosetting polyester resins of the present invention, in combination with the photochromic additives, may be cross-linked by the addition of a suitable cross-linking agent.

The polyester resins are cross-linked by admixing them with a monomer compound containing the polymerizable $CH_2=C<$ group to give a composition that may be cured to a stable thermoset condition. One may use about 10 parts by weight of the monomeric material to about 90 parts by weight of the polyester resin up to about 60 parts of the monomeric material to about 40 parts of the polyester resin. The preferred embodiment, however, is to use from about 25 parts of the monomeric material to about 35 parts of the monomeric material with about 75 parts to about 65 parts, respectively, of the polyester resin.

The monomeric material containing the polymerizable $CH_2=<$ group which may be used in the practice of the present invention, has a boiling point of at least 60° C. Among the polymerizable monomeric materials that will find use in our invention are those such as styrene, sidechain alkyl and halo substituted styrenes such as alpha methylstyrene, alpha chlorostyrene, alpha ethylstyrene and the like or alkyl and halo ring-substituted styrenes such as ortho, meta and paraalkyl styrenes such as o-methylstyrene, p-ethylstyrene, meta-propylstyrene, 2,4 - dimethylstyrene, 2,5 - diethylstyrene, bromostyrene, chlorostyrene, dichlorostyrene, and the like. Still further, one can make use of the allyl compounds such as diallyl phthalate, tetrachlorodiallyl phthalate, allyl alcohol, methallyl alcohol, allyl acetate, allyl methacrylate, diallyl carbonate, allyl lactate, allyl alphahydroxyisobutyrate, allyl trichlorosilane, allyl acrylate, diallyl malonate, diallyl oxalate, allyl gluconate, allyl methylgluconate, diallyl adipate, diallyl sebacate, diallyl citraconate, the diallyl ester of muconic acid, diallyl itaconate, diallyl chlorophthalate, diallyl dichlorosilane, the diallyl ester of endomethylene tetrahydrophthalic anhydride, the diallyl ester of tetrachloroendomethylenetetrahydrophthalic anhydride, triallyl tricarballylate, triallyl aconitate, triallyl cyanurate, triallyl citrate, triallyl phosphate trimethallyl phosphate, tetraallyl silane, tetraallyl silicate, hexallyl disiloxane and the like. These monomeric materials may be used either singly or in combination with one another.

When the thermosetting polyester resin is combined with the cross-linking monomeric material, it is desirable to incorporate therein a polymerization inhibitor in order to prevent premature gelation of the resinous composition, particularly if it is expected that said composition will be subjected to prolonged periods of storage or if it is expected that it will be subjected to temperatures significantly higher than room temperature. With the polymerization inhibitor, the resinous composition will remain stable at room temperature for months without noticeable deterioration. Amongst the polymerization inhibitors may be used are any of those which are conventially known and used in the art such as hydroquinone, benzaldehyde, ascorbic acid, isoascorbic acid, resorcinol, tannin, symmetrical di - (beta-naphthyl) - p - phenylene diamine, phenolic resins, sulfur comopunds and the like. The concentration of the inhibitor is preferably and as a general rule less than 1% by weight is usually sufficient. However, with the preferred inhibitors, e.g., polyhydric phenols and aromatic amines, one may make use of such small amounts as 0.01% to 0.1%, by weight.

The thermosetting polyester resins can readily be solidified without benefit of catalyst by the application of heat or by the application of heat and pressure. However, in such an operation without benefit of a catalytic agent the time element makes it desirable to incorporate into the composition conventional polymerization catalysts such as the organic superoxides, the alcoholic and acidic peroxides. Among the preferred catalysts are: the acidic peroxides, e.g., benzoyl peroxide, phthalic peroxide, succinic peroxide and benzoyl acetic peroxide; fatty oil acid peroxides, e.g., coconut oil acid peroxides, lauric peroxide, stearic peroxide and oleic peroxide; alcohol peroxides, e.g., tertiary-butyl hydroperoxide, usually called tertiarybutyl peroxide and terpene oxides, e.g., ascaridole. Still other polymerization catalysts might be used in some instances, e.g., soluble cobalt salts (particularly the linoleate and naphthenate), p-toluene sulfonic acid, aluminum chloride, stannic chloride and boron trifluoride and azobisisobutyronitrile.

As mentioned above, the method used to prepare the polyester resins used in the formation of the novel compositions of the present invention is not critical and any known method may be used. The only criteria which must be followed in adding the photochromic compound to the polyester resin is in regard to the residual acid or anhydride present in the polyester. All acid or anhydride of this nature must first be removed, such as by washing with a basic solution, since acids and anhydrides interfere chemically with the photochromic nature of the added compounds.

It should also be noted that these photochromic compounds, no matter to what media they are being added, should be added before the media is cured or set thermally or otherwise.

Various other resinous systems to which the photochromic compounds may be added include such materials as cellulose acetate, cellulose acetate butyrate, cellulose propionate, etc. as well as the nitro cellulose materials and also acid-cured epoxy-type polymers, as mentioned above.

The amount of photochromic material incorporated into the desired media in each instance is not critical and depends generally upon the intensity of the color of the composition desired upon irradiation thereof, i.e. the more compound added, the greater the color intensity. However, an amount of photochromic material ranging from about .001% to about 10%, by weight preferably about 0.01% to about 1.0%, by weight, based on the weight of the resinous polymer may be used.

In regard to the acrylates, methacrylates, styrene and vinyl halide polymers, the actual polymerization process employed in the production of these polymers is not critical, and generally any known process for the polymerization of the monomeric materials may be employed. The exact process used in each instance is governed more by the monomers being polymerized than any other single feature. One polymerization method which may be used for example, comprises conducting the polymerization of, for example, methyl methacrylate, styrene catalyst (and a polymerization regulator) at temperatures of from about 10° C. to 90° C. Any known free radical generating catalyst which initiates the polymerization of, for example, methyl methacrylate, styrene or vinyl chloride, may be used. Suitable catalysts include, for example, the organic peroxides such as methyl ethyl ketone peroxide, benzoyl peroxide; the hydroperoxides such as cumene hydroperoxide; the persulfate type compounds such as potassium persulfate, or catalysts such as azobisisobutyronitrile and the like. Additionally, such catalysts as lauroyl peroxide, 2,5-dimethyl-2,5-di(t-butylperoxy)hexane, the dialkyl peroxides, e.g. diethyl peroxide, dipropyl peroxide, di(tertiary-butyl)peroxide, tertiary-butyl hydrogen peroxide (tertiary-butyl hydroperoxide), tertiary-amyl hydrogen peroxide, ammonium persulfate, sodium persulfate, sodium percarbonate, potassium percarbonate, sodium perborate, potassium perborate, sodium perphosphate, potassium perphosphate, etc. Other examples of organic peroxide catalysts which may be employed are the following: tertiary-butyl perbenzoate, 2,4-dichlorobenzoyl peroxide, 2,2-bis(tertiary-butylperoxy)-butane, and the like. Catalyst concentrations ranging from 0.0001 to 5.00 parts, by weight, based on the weight of the monomer employed may advantageously be used.

Emulsion polymerization processes using any available emulsifier may also be used.

Physical blending of the media and photochromic substance may be conducted by any known procedure such as by utilizing a ball mill, a tumbler mixer, hot rolls, emulsion blending techniques, Banbury mixers, Waring blendors and the like. Another procedure which may be employed is known as a devolatilization-extrusion method, wherein separate streams of solutions of the selected media and photochromic material are subjected to mixing, compounding, devolatilization and extrusion in commercially available devices. In the devolatilizer-extruder, the mixture is worked in a chamber under heat and vacuum so that new surfaces of the mixture are continuously and rapidly exposed to vacuum to remove the solvent before extruding the product.

The scope of the instant invention is also of such breadth so as to include various formed articles produced from the novel compositions of matter disclosed above. Therefore, such shaped articles as films, foils, fibers, moldings, castings, laminates, and the like form part of the present invention. Specific properties and characteristics of these articles are set forth more fully hereinbelow in regard to the examples listed.

The compositions of this invention may be further modified with such compatible materials as fillers, lubricants, plasticizers, colorants, etc. Additionally, our compositions may be modified by adding dyes thereto in order to modify the color of the original photochromic additive and present a finl composition more pleasing to the eye. Modifications of this type are especially useful when such articles as sunglasses and the like are being prepared.

It is also possible to lengthen the life of the composition by incorporating various amounts of an ultra-violet light stabilizer into the compositions. In this manner the photochromic life of the added photochromic material is lengthened by preventing an extraneous amount of ultra-violet light from coming into contact with the photochromic material. When absorbers of this type are added, amounts up to about 20% by weight, based on the weight of the polymeric media, may be used.

The polymeric compositions of the present invention may also be utilized for such things as variable transmission windows, data processes, communications, advertising, sun glasses, toys and novelties, military applications and the like.

The following examples are set forth for purposes of illustration only and are not to be construed as limitations on the present invention except as set forth in the appended claims. All parts and percentages are by weight unless otherwise indicated.

EXAMPLE 1

100 parts of a benzene solution of poly(methylmethacrylate) (20% solids) and 10 parts of bis[(phenylazo)-thioformic acid 2-phenylhydrazidato]Zn(II) are drawn down on a glass plate and allowed to set for five hours to remove the solvent. The resultant film is pink to red and changes to blue to violet when subjected to irradiation at 25° C. The return rate (return half-life) is less than 20 seconds. The color change and reversion can be repeated many times without noticeable change in the color intensity or the return rate.

EXAMPLE 2

100 parts or polystyrene are added to 200 parts of methylene chloride to form a complete solution thereof. To this solution is added 1 part of bis[(phenylazo)thioformic acid 2-phenylhydrazidato]Pt(II). The resultant solution is drawn down on a glass plate and allowed to dry at 25° C. to evaporate the solvent. The resultant film, upon removal from the glass plate, is yellow and turns red upon being subjected to ultraviolet light at 25° C. The film returns to its original color upon removal from the ultraviolet light, in less than 20 seconds.

EXAMPLE 3

Following the procedure of Example 2 except that poly(vinyl chloride) is utilized as the polymeric media, and the cadmium complex is utilized as the photochromic additive, an orange film is produced which, when contacted with visible light, becomes gray and returns to its orange color, upon removal of the light, in less than 20 seconds. The color change and subsequent reversion cycle is repeated 5,000 times with no evidence of decrease in color intensity or rapidity of color change.

EXAMPLE 4

100 parts of a powdery commercially available cyanoethylated cellulose (nitrogen content—12%; degree of substitution—2.7) and 1 part of tris[(phenylazo)thioformic acid .2-phenylhydrazidato]Bi(II) are added to a ball mill mixer. The ingredients are allowed to thoroughly mix for about 30 minutes. A solution of the mixture is prepared by dissolving it in acetone and a film of the cyanoethylated cellulose mixture is then cast on a glass plate by evaporating the solvent at room temperature. The resultant film, which is orange in color, becomes pale violet when contacted with ultraviolet light and returns to its original color when removed from said light, in less than 60 seconds.

EXAMPLE 5

Into a suitable reaction vessel are added 400 parts of acrylonitrile and 15 parts of sodium hydroxide. To this mixture is added 50 parts of water and 0.35 part of isopropyl naphthalene sodium sulfonate, as an emulsifier.

The resultant mixture is agitated for ½ hour and 25 parts of white cotton yarn are then added. The temperature is raised to 38° C. and the reaction mixture is thoroughly agitated for one hour. The sodium hydroxide is then neutralized with phosphoric acid and the yarn is washed with water. The nitrogen content is 13.1% and the degree of substitution is 2.9. To the yarn is then added a solution of 15 parts of bis[(phenylazo)thioformic acid 2-phenylhydrazidato]Pd(II) in CHCl₃. Upon removal of the solvent by evaporation, the resultant green yarn turns blue when contacted with visible light at 25° C. and returns to its original color when removed from said light in about 150 seconds.

EXAMPLE 6

100 parts of a powdered, commercially available, spray dried melamine-formaldehyde resin (mole ratio of formaldehyde to melamine 2:1) is added to a ball mill along with 0.1 part of monol[(phenylazo)thioformic acid 2-phenylhydrazidato]Ag(I). The ingredients are allowed to thoroughly mix and the resultant admixture is placed into a pre-heated saucer-shaped mold and heated to 155° C. for five minutes. The resultant yellow saucer darkens in color to purple and returns to its original color in less than 60 seconds when it is subjected to visible light at 25° C. and then removed therefrom.

EXAMPLE 7

A commercially available polyester resin of maleic anhydride, phthalic anhydride and propylene glycol (15.1/46.2/38.7) is washed three times with an aqueous solution of NaCO₃ at 20° C. to rid the polyester of residual anhydride therein. The polyester is then dried over calcium chloride for two hours and to 100 parts of it is added one part of bis[(phenylazo)thioformic acid 2-phenylhydrazidato]Pb(II). To this mixture are then added 70 parts of styrene. The resultant mixture is then poured between glass plates and sealed. The plates are heated for 12 hours at 90° C. and for 1½ hours at 110° C. The resultant polyester casting is orange and turns to a light gray upon contact with visible light. The casting returns to its orange color when removed from said light in less than 20 seconds.

Following the procedures of Examples 1–7, the specific procedure in each instance being governed by the specific polymer media employed, various photochromic additives of the type produced as described hereinabove are added to various polymer substrates. In each instance, the resultant article produced changes color when subjected to visible or ultraviolet light and quickly reverts to its original color when removed therefrom. The results obtained, in each instance, are set forth hereinbelow in Table I.

TABLE I

| Example | Photochromic Additive | | | | | Polymer Media of Ex.² | Color change | Temp., °C. | Return t½ sec. | Color stability | Activation wavelength |
|---|---|---|---|---|---|---|---|---|---|---|---|
| | R | R¹ | M | m | Percent | | | | | | |
| 8 | Phenyl | Phenyl | Hg | 2 | 1.0 | 1 | Orange-blue | 25 | 9,000 | Fair | 400–700 |
| 9 | do | do | Hg | 2 | 1.0 | 2 | do | 25 | 8,600 | do | 400–700 |
| 10 | do | do | Pb | 2 | 1.0 | CA | Green-orange | 25 | 1,100 | Excellent | 400–700 |
| 11 | do | do | Pd | 2 | 1.0 | CA | do | 25 | 100 | do | 400–700 |
| 12 | do | do | Pd | 2 | 1.0 | 1 | do | 25 | 150 | do | 400–700 |
| 13 | do | do | Pd | 1 | 0.1 | 2 | Yellow-purple | 25 | 1,900 | do | 300–400 |
| 14 | do | do | Ag | 1 | 0.1 | CA | do | 25 | <60 | Good | 300–400 |
| 15 | do | do | Ag | 1 | 0.1 | 1 | do | 25 | <60 | do | 300–400 |
| 16 | do | do | Ag | 2 | 0.5 | 3 | Pink-purple | 25 | <20 | do | 400–700 |
| 17 | do | do | Zn | 2 | 0.1 | 3 | Orange-grey | −80 | <60 | do | 400–700 |
| 18 | do | do | Pb | 3 | 0.1 | 3 | do | −80 | <20 | do | 400–700 |
| 19 | do | do | Bi | 3 | 0.1 | 6 | do | 25 | <0.1 | do | 400–700 |
| 20 | do | do | Ni | 1 | 0.5 | 7 | do | 25 | <0.1 | do | 400–700 |
| 21 | do | do | Tl | 2 | 3.5 | 5 | Yellow-red | 25 | <20 | Excellent | 400–700 |
| 22 | Naphthyl | Naphthyl | Pt | 2 | 2.0 | 4 | Orange-grey | 20 | <20 | do | 400–700 |
| 23 | Tolyl | Tolyl | Pb | 2 | 1.0 | 1 | do | 25 | <0.1 | do | 400–700 |
| 24 | p-Ethylphenyl | p-Ethylphenyl | Ni | 2 | .01 | 3 | Blue-purple | 25 | <20 | do | 400–700 |
| 25 | p-Butylphenyl | p-Butylphenyl | Cd | 2 | 0.1 | 2 | Orange-grey | −10 | <20 | do | 400–700 |
| 26 | o-Nitrophenyl | m-Nitrophenyl | Pd | 2 | 2.0 | 2 | Green-orange | −40 | <50 | do | 400–700 |
| 27 | p-Chlorophenyl | p-Chlorophenyl | Bi | 3 | 0.1 | 1 | Orange-grey | 25 | 1,600 | Fair | 400–700 |
| 28 | 2-iodo-1-naphthyl | 2-iodo-1-naphthyl | Ag | 1 | 0.1 | 4 | Yellow-purple | 25 | 60 | Good | 400–700 |
| 29 | o-Methoxyphenyl | o-Methoxyphenyl | Tl | 2 | 7.0 | 2 | Orange-grey | 25 | <0.1 | do | 400–700 |
| 30 | o-Butoxyphenyl | o-Butoxyphenyl | Pb | 2 | 0.1 | CA | Yellow-red | 25 | <20 | Excellent | 400–700 |
| 31 | m-Pentoxycarbonylphenyl | m-Pentoxycarbonylphenyl | Pb | 2 | 2.5 | 6 | Orange-grey | −80 | <30 | do | 400–700 |
| 32 | m-Methoxycarbonylphenyl | m-Methoxycarbonylphenyl | Ni | 2 | 1.5 | 5 | do | 25 | <0.1 | Good | 400–700 |
| 33 | p-Phenyloxyphenyl | p-Phenyloxyphenyl | Zn | 2 | .001 | 1 | Pink-purple | 25 | <20 | do | 400–700 |
| 34 | o-Hydroxyphenyl | o-Hydroxyphenyl | Pd | 2 | 5.0 | 2 | Orange-grey | −80 | 130 | do | 400–700 |
| 35 | p-Formamidophenyl | p-Formamidophenyl | Bi | 2 | 1.0 | 6 | Green-orange | 25 | <60 | do | 400–700 |
| 36 | 3-methyl-2-naphthyl | 3-methyl-2-naphthyl | Pd | 3 | 0.5 | 7 | Yellow-purple | −80 | 60 | do | 400–700 |
| 37 | 5-butyl-1-naphthyl | 5-butyl-1-naphthyl | Ag | 1 | 1.0 | 4 | Orange-grey | 25 | <0.1 | do | 400–700 |
| 38 | 2-methoxycarbonyl-1-naphthyl | 2-methoxycarbonyl-1-naphthyl | Tl | 2 | 0.3 | 2 | Yellow-red | 25 | <20 | do | 400–700 |
| 39 | 6-pentoxycarbonyl-2-naphthyl | 6-pentoxycarbonyl-2-naphthyl | Pt | 2 | 6.0 | 7 | Orange-grey | 25 | <20 | do | 400–700 |
| 40 | 4-biphenylyl | 4-biphenylyl | Pb | 2 | 8.0 | 4 | do | 25 | <0.1 | do | 400–700 |
| 41 | o-1-naphthylphenyl | o-1-naphthylphenyl | Ni | 2 | 4.5 | 4 | Pink-purple | 25 | <0.1 | do | 400–700 |
| 42 | 3-naphthyl-2-naphthyl | 3-naphthyl-2-naphthyl | Zn | 2 | 1.0 | 3 | Orange-grey | 25 | <20 | do | 400–700 |
| 43 | p-Carboxyphenyl | p-Carboxyphenyl | Cd | 2 | 0.1 | 2 | do | 25 | 110 | do | 400–700 |
| 44 | o-(3-carboxypropyl)-phenyl | 4-biphenylyl | Pd | 2 | 1.5 | | Green-orange | | | | |
| 45 | p-anilinophenyl | Tolyl | | | | | | | | | |
| | | p-Anilinophenyl | | | | | | | | | |

TABLE I

| | Photochromic Additive | | | | | Polymer Media of Ex.[2] | Color change | Temp., °C. | Return t1/2 sec. | Color stability | Activation wavelength |
|---|---|---|---|---|---|---|---|---|---|---|---|
| | R | R[1] | M | m | Percent | | | | | | |
| 46 | 4-Anilino-2-naphthyl | p-Chlorophenyl | Bi | 3 | 0.5 | CA | Orange-grey | −80 | <60 | Fair | 400–700 |
| 47 | m-2-naphthyl-aminophenyl | m-2-naphthyl-aminophenyl | Ag | 1 | 0.1 | 5 | Yellow-purple | 25 | 60 | Good | 300–400 |
| 48 | p-o-Toluidinophenyl | m-phenoxyphenyl | Tl | 1 | 9.0 | 7 | Orange-grey | 25 | <0.1 | Excellent | 400–700 |
| 49 | m-Tolyloxyphenyl | p-fluorophenyl | Pt | 2 | 1.0 | 2 | Yellow-red | 25 | <20 | do | 400–700 |
| 50 | m-naphthyloxyphenyl | m-Ethoxyphenyl | Pb | 2 | 10 | 6 | Orange-grey | 25 | <20 | do | 400–700 |
| 51 | 4-naphthyloxy-1-naphthyl | 4-naphthyloxy-1-naphthyl | Ni | 2 | 3.5 | 1 | do | 25 | <0.1 | do | 400–700 |
| 52 | p-Acetylphenyl | p-Acetylphenyl | Zn | 2 | 0.1 | 3 | Pink-purple | −80 | <20 | do | 400–700 |
| 53 | p-8-octanoyl-2-naphthyl | p-Acetamidopheny | Cd | 2 | 0.1 | 5 | Orange-grey | 25 | <20 | do | 400–700 |
| 54 | o-Benzoylphenyl | o-Benzoylphenyl | Pd | 2 | 0.1 | 4 | Green-orange | 25 | 191 | do | 400–700 |
| 55 | p-(2,3,4-trimethylbenzoyl)-phenyl | Phenyl | Bi | 3 | 0.5 | 6 | Orange-grey | −80 | <60 | do | 400–700 |
| 56 | 2-Naphthoylphenyl | p-Carboxyphenyl | Ag | 1 | 0.1 | 7 | Yellow-purple | 25 | <60 | Good | 400–700 |
| 57 | p-Naphthamidophenyl | p-Benzamidophenyl | Tl | 1 | 2.6 | 1 | Orange-grey | 25 | <0.1 | do | 300–400 |
| 58 | m-Valeramidophenyl | 7-benzamido-1-naphthyl | Pt | 2 | 1.0 | CA | Yellow-red | 25 | <20 | do | 400–700 |
| 59 | p-Naphthamidophenyl | p-Carboxymethylphenyl | Pb | 2 | 4.0 | 2 | Orange-grey | 25 | <20 | do | 400–700 |
| 60 | m-(3-carboxypropyl)phenyl | p-(5-tetralyl)-phenyl | Ni | 2 | 3.6 | 3 | do | 25 | <0.1 | do | 400–700 |
| 61 | 2-(4-tetralyl)naphthyl | 2-(4-tetralyl)naphthyl | Zn | 2 | 4.1 | 6 | Pink-purple | −80 | <20 | Fair | 400–700 |
| 62 | p-(perfluoromethylthio)phenyl | 2-methylthio-1-naphthyl | Cd | 2 | 2.4 | 4 | Orange-grey | 25 | <20 | Good | 400–700 |
| 63 | m-(Perfluorobutylthio)-phenyl | 1-(perfluoromethylthio)-2-naphthyl | Pd | 2 | 1.5 | 2 | Green-orange | 25 | 1,800 | do | 400–700 |
| 64 | p-(Butylthio)-phenyl | 2-methyl-1-naphthyl | Bi | 3 | 1.0 | 1 | Orange-grey | −80 | <60 | do | 400–700 |
| 65 | 2-nitro-1-naphthyl | p-Sulfamoylphenyl | Ag | 1 | 1.0 | 3 | Yellow-purple | 25 | <20 | do | 400–700 |
| 66 | 4-sulfamoyl-2-naphthyl | 4-sulfamoyl-2-naphthyl | Tl | 1 | 1.0 | 4 | Yellow-red | 25 | <0.1 | do | 300–400 |
| 67 | 4-sulfo-2-naphthyl | 1-bromo-2-naphthyl | Pt | 2 | 2.0 | 7 | Orange-grey | 25 | <20 | do | 400–700 |
| 68 | 2-methoxy-1-naphthyl | p-Aminophenyl | Pb | 2 | 2.0 | 6 | Orange-grey | 25 | <20 | do | 400–700 |
| 69 | 3-amino-1-naphthyl | p-Hydroxyphenyl | Ni | 2 | 1.5 | 5 | do | 25 | <0.1 | do | 400–700 |
| 70 | 2-hydroxy-1-naphthyl | 2-butylthio-1-naphthyl | Zn | 2 | 5.0 | CA | Pink-purple | −80 | <20 | do | 400–700 |
| 71 | p-sulfamoyl-1-naphthyl | 6-sulfo-2-naphthyl | Cd | 2 | 2.5 | CAB | Orange-grey | 25 | <20 | do | 400–700 |
| 72 | p-methylaminophenyl | 1-Methylamino-2-naphthyl | Pd | 2 | 0.1 | 4 | Green-orange | 25 | 180 | Fair | 400–700 |
| 73 | m-butylaminophenyl | Naphthyl | Bi | 3 | 1.0 | 1 | Orange-grey | −80 | <60 | Good | 300–400 |
| 74 | p-butylamino-1-naphthyl | p-(Hexoxycarbonyl)phenyl | Ag | 1 | 1.0 | 1 | Yellow-purple | 25 | 60 | do | 400–700 |
| 75 | p-(hexoxycarbonyl)phenyl | 2-phenyl-1-naphthyl | Tl | 1 | 2.0 | 4 | Yellow-red | 25 | <0.1 | do | 400–700 |
| 76 | 4-sulfamoyl-2-naphthyl | 4-sulfamoyl-2-naphthyl | Pt | 2 | 1.5 | 7 | Yellow-red | 25 | <20 | do | 400–700 |
| 77 | 3-iodo-1-naphthyl | 2-phenyl-1-naphthyl | Pb | 2 | 2.0 | 6 | Orange-grey | 25 | <20 | do | 400–700 |
| 78 | o-fluorophenyl | o-Iodophenyl | Ni | 2 | 1.5 | 2 | do | 25 | >20 | do | 400–700 |
| 79 | m-Carboxymethylphenyl | 6-naphthylamino-2-naphthyl | Zn | 2 | 0.1 | CA | Pink-purple | −80 | >0.1 | do | 400–700 |
| 80 | m-Methylthiophenyl | 2-fluoro-1-naphthyl | Cd | 2 | 0.1 | 3 | Orange-grey | 25 | <20 | do | 400–700 |
| 81 | Phenyl | 3-butoxy-1-naphthyl | Pd | 2 | 1.0 | 4 | Green-orange | 25 | <20 | do | 400–700 |
| 82 | p-Ethoxycarbonylphenyl | 6-phenoxy-2-naphthyl | Bi | 3 | 2.0 | 3 | Orange-grey | −80 | <60 | Excellent | 400–700 |
| 83 | p-Chlorophenyl | 3-acetyl-1-naphthyl | Ag | 1 | 1.0 | 2 | Yellow-purple | 25 | <60 | do | 400–700 |
| 84 | Phenyl | 3-formamido-1-naphthyl | Tl | 1 | 3.0 | 7 | Orange-grey | 25 | <0.1 | do | 300–400 |
| 85 | 2-naphthamido-1-naphthyl | 2-naphthamido-1-naphthyl | Pt | 2 | 1.0 | 1 | Yellow-red | 25 | <20 | do | 400–700 |
| 86 | 5-carboxymethyl-2-naphthyl | 5-carboxymethyl-2-naphthyl | Pb | 2 | 6.5 | 2 | Orange-grey | 25 | <20 | do | 400–700 |
| 87 | 1-carboxybutyl-2-naphthyl | 1-carboxybutyl-2-naphthyl | Ni | 2 | 9.0 | 2 | do | 25 | <0.1 | do | 400–700 |
| 88 | p-Tetralylphenyl | 2-(perfluorobutylthio)-1-naphthyl | Zn | 2 | 0.1 | CA | Pink-purple | −80 | <20 | do | 400–700 |

[1] Comparative.
[2] The polymeric media of Examples 1–7 were followed except as where indicated; CA = cellulose acetate; CAB = cellulose acetate butyrate.

CODE FOR TABLE I formula

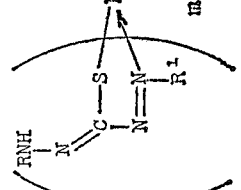

What is claimed is:

1. A photochromic composition of matter consisting essentially of a synthetic, organic polymer selected from the group consisting of acrylic and methacrylic polymers, styrene polymers, vinyl halide polymers, cyanoethylated cellulosic materials, aminoplast resins, polyester resins, cellulose acetate polymers and epoxy polymers having incorporated throughout the body thereof from about 0.001% to about 10.0%, by weight, based on the weight of said polymeric material, of a compound having the formula wherein M is selected from the group consisting of $Pd^{II}$, $Pt^{II}$, $Ni^{II}$, $Ag^{I}$, $Zn^{II}$, $Cd^{II}$, $Pb^{II}$, $Bi^{III}$, and $Tl^{I}$, $m$ is a whole positive integer of from 1 to 3, inclusive, and R and R[1] are individually selected from the group consisting of

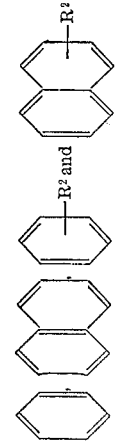

and R[2] is selected from the group consisting of alkyl ($C_1$–$C_4$), nitro, halo, alkoxy ($C_1$–$C_4$), aryloxy ($C_6$–$C_{10}$), hydroxy, carboxy, carboxyalkyl (C₂–C₄), alkoxycarbonyl (C₂–C₆), aryl (C₆–C₁₀), sulfamoyl, sulfo, arylamino (C₆–C₁₀), alkylamino (C₁–C₄), amino, acyl (C₂–C₁₁), acylamino (C₁–C₁₁), tetralyl, perfluoroalkylthio (C₁–C₄) and alkylthio (C₁–C₄) radicals.

2. A composition of matter according to claim 1 wherein R and R' are phenyl radicals.

3. A composition according to claim 1 wherein R and R' are

radicals.

4. A composition according to claim 3 wherein R² is an alkoxy radical.

5. A composition according to claim 3 wherein R² is an hydroxy radical.

6. A composition according to claim 3 wherein R² is a nitro radical.

7. A composition according to claim 3 wherein R² is a carboxy radical.

8. A composition according to claim 3 wherein R² is a halo radical.

9. A composition according to claim 1 wherein the polymeric material is a polymer of methyl methacrylate.

10. A composition according to claim 1 wherein the polymeric material is a polymer of styrene.

References Cited

UNITED STATES PATENTS 3,361,726  1/1968  Meriwether et al.

GEORGE F. LESMES, Primary Examiner

J. P. BRAMMER, Assistant Examiner

U.S. Cl. X.R.

260—45.75, 149; 350—160